United States Patent [19]
Pettit

[11] Patent Number: 6,105,902
[45] Date of Patent: Aug. 22, 2000

[54] AIRCRAFT FUSELAGE AND METHOD OF FORMING SAME

[75] Inventor: Richard G. Pettit, Ithaca, N.Y.

[73] Assignee: McDonnell Douglas Corporation, Huntington Beach, Calif.

[21] Appl. No.: 08/893,041

[22] Filed: Jul. 15, 1997

[51] Int. Cl.[7] .......................................... B64C 1/06
[52] U.S. Cl. ............................ 244/119; 244/120; 244/131
[58] Field of Search .................................... 244/119, 120, 244/123, 117 R, 131, 132

[56] References Cited

U.S. PATENT DOCUMENTS 5,518,208  5/1996  Roseburg ................................ 244/120

*Primary Examiner*—J. Woodrow Eldred
*Attorney, Agent, or Firm*—Harness Dickey & Pierce P.L.C.

[57] ABSTRACT

An apparatus and method for forming an aircraft fuselage having at least one doubly curved portion. A plurality of fuselage panels are extruded with integrally formed stiffening portions extending preferably longitudinally the full length of each fuselage panel. The stiffening portions are further formed so as to be generally parallel to one another. The fuselage panels are then formed into skin panels having a desired curvature and trimmed into gores, and the stiffening portions trimmed at end portions that run out toward longitudinal edges of the panels. When adjacent panels are affixed together, the stiffening portions run out toward longitudinal edges of adjacent panels. The longitudinal edges are secured by splice longerons which are riveted or welded to the longitudinal edges of the skin panels. Independent fastening members are then secured to the stiffening portions and the splice longerons at the points where the stiffening portions run out to positions closely adjacent the splice longerons. The apparatus and method permits aircraft fuselages having doubly curved portions to be formed from extruded panels which is more cost efficient and makes use of a greater percentage of raw materials than conventional methods of machining such panels out of non-near-net stock such as plate.

22 Claims, 3 Drawing Sheets

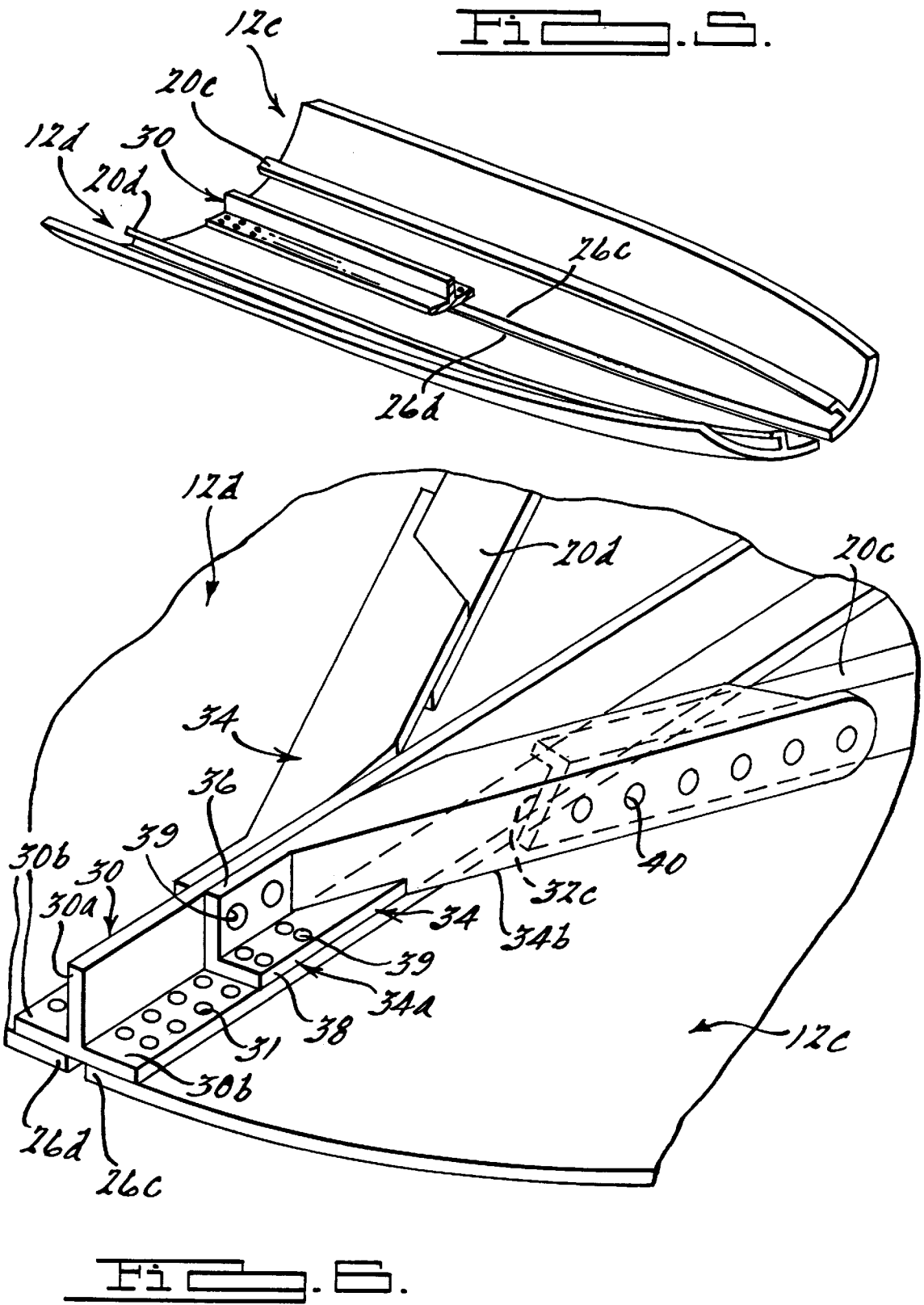

AIRCRAFT FUSELAGE AND METHOD OF FORMING SAME

TECHNICAL FIELD

This invention relates to the construction of aircraft fuselages, and more particularly to an aircraft fuselage and method of forming same through the use of a plurality of independently formed splice longerons and independent fastening members which allow a fuselage portion having a non-constant diameter to be formed from a plurality of extruded skin panels.

BACKGROUND OF THE INVENTION

Background Art

Most aircraft employ a fuselage having a constant-section (i.e., center) portion and doubly curved forward and aft sections. While such structures could potentially be produced using a variety of processes, large parts such as stiffened aircraft fuselage skins presently can be made from large axially stiffened near-net extrusions or, alternatively, directly machined out of plate. The use of extrusions are favored from a cost-effectiveness standpoint because extruding involves less labor and utilizes a much greater fraction of the raw material used for producing the fuselage skins. Patents involving the formation of aircraft fuselage skins or other curving structures are U.S. Pat. Nos. 2,230,393; 2,427,065; 2,458,686; 3,096,958; 3,920,206; 3,940,891; 4,310,132; 4,471,609 and 5,154,373, the disclosures of which are hereby incorporated by reference.

For the constant-section portion of the fuselage, the application of extrusions if fairly straightforward because the fuselage skins can be formed with integrally formed stiffeners which are parallel to one another. Wing planks often employ parallel stiffeners in both integral and multi-piece construction because they are substantially flat or singly curved. However, the application of extrusions in the doubly curved forward and aft sections of the fuselage is complicated by the fact that the spacing of the stiffeners typically varies as the fuselage diameter increases or decreases. As will be appreciated, with present day extrusion processes it is not possible to achieve variable spacing of the stiffeners when extruding large stiffened fuselage panels. Thus, doubly curved portions of the fuselage, following present day design and fabrication concepts, can only be made with integrally formed stiffening portions by machining out of non-near-net stock, such as plate, with the associated inefficient material usage.

It would therefore be highly desirable to provide an aircraft fuselage and a method for manufacturing same which allows a plurality of extruded fuselage panels, each having a plurality of integrally formed stiffening elements, to be secured to one another by a plurality of independent members such that doubly curved sections of the fuselage can be formed in a cost effective manner.

It would also be highly desirable to provide a method of forming a complexly shaped aircraft fuselage through conventional extrusion techniques, wherein independent skin panels of the fuselage each have integrally formed stiffening members, and where the integrally formed stiffening members of adjacent skin panels can be secured together by independent fastening members to provide added structural strength and rigidity to the fuselage.

Still further, it would be very advantageous to be able to form an aircraft fuselage having one or more doubly curved portions in which a plurality of fuselage panels are extruded, and where each of the fuselage panels include integrally formed stiffening portions which could be coupled together via a plurality of splice longerons and also via independent fastening members to fasten the stiffening portions of each of the fuselage panels to the splice longerons at the areas where the stiffening portions run out into contact with the splice longerons.

DISCLOSURE OF INVENTION

The above and other objects are provided by an aircraft fuselage and method of forming same in accordance with the present invention. The method of the present invention involves extruding a plurality of fuselage panels, wherein each fuselage panel includes at least one integrally formed stiffening portion extending longitudinally therealong. Each of the fuselage panels is then formed into a fuselage skin panel having at least one doubly curved portion. Each of the fuselage skin portions are then trimmed such that when the fuselage skin panels are secured together they will form a portion of the aircraft fuselage having the desired complex contour. The fuselage skin panels are then secured to one another along longitudinal edges thereof by a plurality of independently formed splice longerons. The splice longerons couple adjacent longitudinal edges of adjacently positioned pairs of fuselage skin panels and may be riveted, welded or adhesively bonded to the longitudinal edges. Alternatively, adjacent skin panels may be secured to one another by welding, such as friction stir welding, or other suitable welding techniques, or even adhesives.

In one embodiment independent fastening members are used to couple those integrally formed stiffening portions of adjacent fuselage skin panels which run out towards and into contact with an intermediately disposed splice longeron to the splice longeron. The independent fastening members may be riveted, adhesively bonded or welded to the stiffening portions and the splice longeron to provide structural strength and rigidity to the assembled fuselage.

With the apparatus and method of the present invention, the aircraft fuselage panels and the splice longerons may be extruded, thus saving significant material costs over other manufacturing processes for constructing aircraft fuselages. More specifically, the method of the present invention enables complexly shaped fuselages to be formed through efficient extrusion processes, therefore resulting in significantly less wasted material and reduced labor costs.

BRIEF DESCRIPTION OF THE DRAWINGS

The various advantages of the present invention will become apparent to one skilled in the art by reading the following specification and subjoined claims and by referencing the following drawings in which:

FIG. 5 is a perspective view of a pair of fuselage panels which have been formed into fuselage skin panels and a portion of one splice longeron which is used to secure the two fuselage skin panels together adjacent one another; and FIG. 6 is a perspective view of two independent fastening members securing portions of integrally formed stiffening members from two adjacently positioned fuselage skin panels to an intermediately disposed splice longeron.

DETAILED DESCRIPTION OF THE INVENTION

Figure 1:
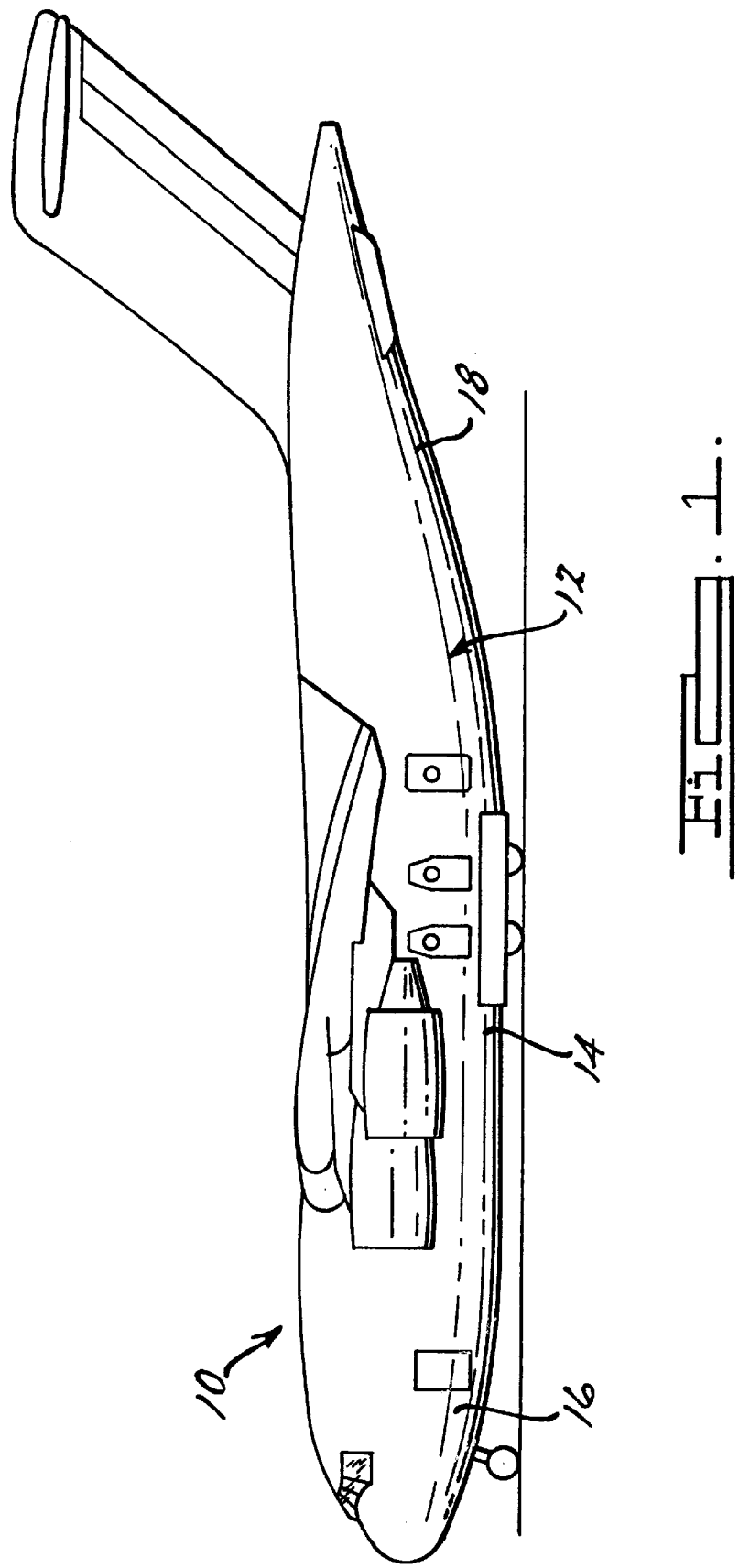
FIG. 1 is an elevational view of an aircraft having a fuselage having doubly curved forward and aft sections.

Referring to FIG. 1, there is shown an aircraft 10 having a fuselage 12. The fuselage 12 has a generally constant diameter center section 14, a doubly curved forward section 16 and a doubly curved aft section 18. By "doubly curved", it is meant a cross sectional portion of the fuselage 12 which has a non-constant or changing radius. As explained previously herein, the manufacture of such a fuselage 12 by present day conventional methods can be costly and inefficient. The method and apparatus of the present invention, however, allows for the manufacture of complexly shaped fuselages in a more efficient and cost effective manner, as will now be described.

Figure 2:
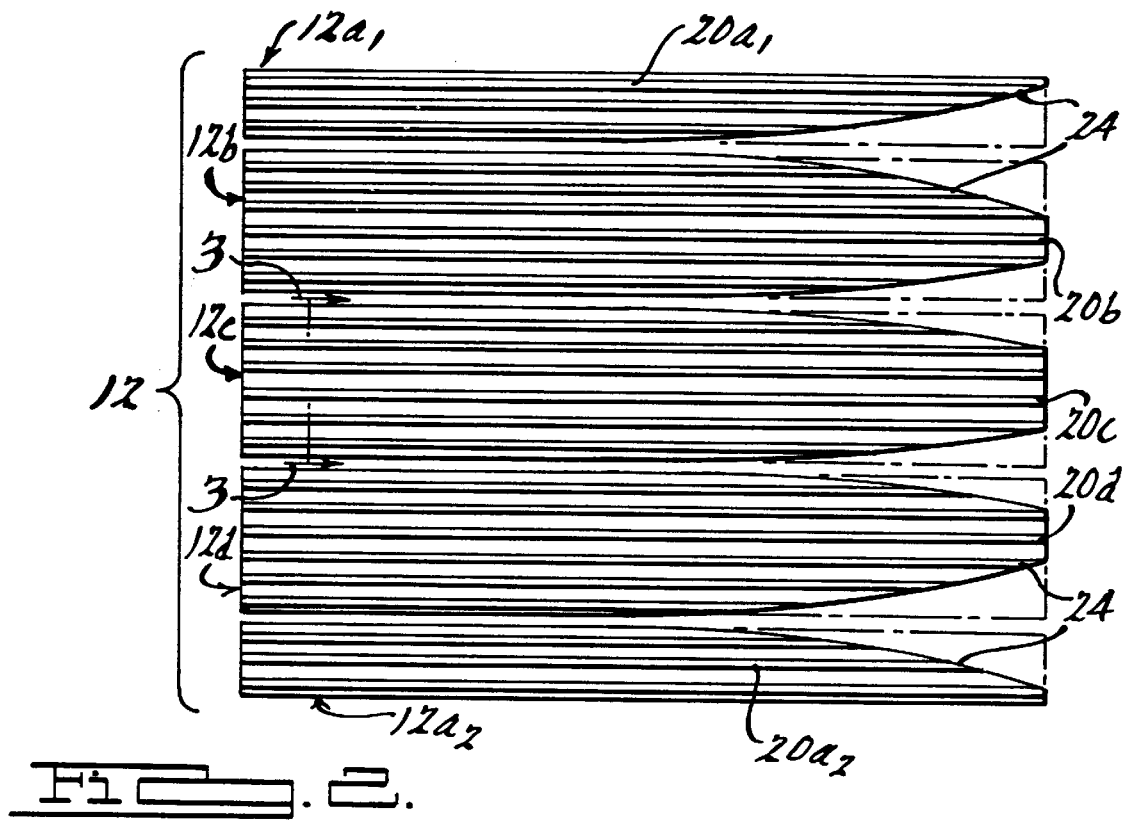
FIG. 2 is a plan view of a plurality of independent fuselage panel portions, wherein the dashed lines indicate portions of each fuselage panel which have been trimmed away prior to each of the sections being secured together, and which also indicate a plurality of longitudinally extending, integrally formed stiffening portions formed on each fuselage panel.

Referring to FIG. 2, the method of the present invention involves forming the fuselage 12 by extruding a plurality of fuselage panels 12a–12d. It will be appreciated that the number of fuselage panels 12a–12d will depend upon the overall diameter of the fuselage 12. It will also be appreciated that for the purpose of illustration, panel 12a has been illustrated split into two sections 12a1 and 12a2. Thus, the illustration of four fuselage panels 12a–12d is meant to be representative only of the fact that several independent fuselage panels are typically required to form the fuselage 12.

Figure 3:
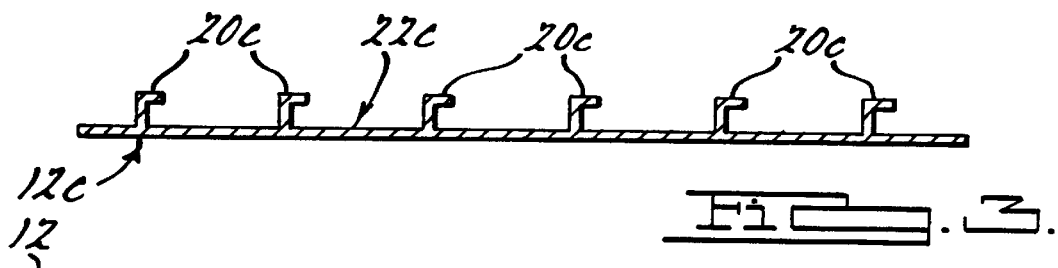
FIG. 3 is a cross sectional view in accordance with section line 3—3 in FIG. 2 illustrating the plurality of integrally formed stiffening portions of one fuselage panel.

With further reference to FIG. 2, each of the fuselage panels 12a–12d includes a plurality of integrally formed and longitudinally extending stiffening portions 20a–20d, respectively. Again, for the purpose of illustration, portion 20a has been split into portions 20a1 and 20a2. With brief reference to FIG. 3, the stiffening portions 20c can be seen in cross section. Stiffening portions 20c each form generally inverted L-shaped members protruding from an inner surface 22c of fuselage panel 12c. The stiffening portions 20c further are formed to extend, in one embodiment, generally parallel to one another along preferably the entire length or a major portion of the length of the fuselage panel 12c, as can be seen in FIG. 2. It will also be appreciated that in some instances it may be desirable to orient the stiffeners such that they do not extend perfectly parallel to each other or to adjacent panels 12a–12d, but rather diverge or converge as may be required or desired.

The fuselage panels 12a–12d are extruded using conventional extrusion techniques. The extrusion process permits the stiffening portions 20a–20d of each panel 12a–12d to be integrally formed with its fuselage panel, thereby reducing the labor required to form each fuselage panel 12a–12d. The extrusion process also utilizes a much greater portion of the raw material required to make each fuselage panel 12a–12d.

Figure 4:
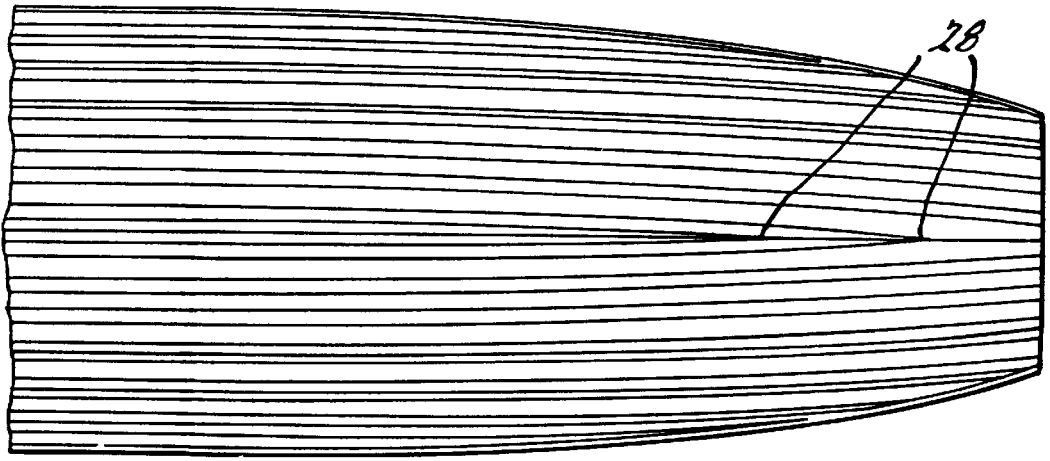
FIG. 4 is a fragmentary elevational view of an inside surface portion of a portion of an aircraft fuselage with the integrally formed stiffening portions indicated in solid parallel lines.

Referring to FIG. 4, prior to being assembled together, each of the fuselage panels 12a–12d are formed into contoured fuselage skin panels such as by stretch forming, creep forming, peen forming or other known processes. The skin panels are then trimmed into gores by removing the material indicated in dashed lines in FIG. 2 from each panel 12a–12d. When spliced together, the panels 12a–12d form a surface having a desired contour. The trimming step could, however, just as easily precede the forming step if desired. Because the stiffening portions 20 of each of the panels 12a–12d have a constant spacing relative to one another prior to each of the fuselage panels 12a–12d being formed into fuselage skin panels, the stiffening portions 20 of each fuselage skin panel 12a–12d will "run-out" at various places along the longitudinal edges of each of the panels, as indicated by reference numerals 24 in FIG. 2.

With further reference specifically to FIG. 4, when any two of the fuselage skin panels 12a–12d are assembled together, the curvature or contour of each of the fuselage skin panels 12a–12d causes the stiffening portions 20c and 20d to run out to the longitudinal edges 26 at approximately the same points, as indicated by reference numerals 28 in FIG. 4. It will be appreciated immediately that in some instances there will usually be several areas where stiffening portions 20 from adjacently positioned fuselage skin panels 12a–12d run out and meet. The number of areas at which the stiffening portions run out and meet will vary depending upon the curvature of the doubly curved portion of the fuselage 12.

Referring now to FIG. 5, to secure adjacent fuselage skin panels 12 together, a plurality of preferably extruded splice longerons 30 are formed and cut to desired lengths. The splice longerons 30 are shown as having an inverted T-shape, but could just as readily take other shapes as desired. The desired length will depend on the overall length of each of the fuselage skin panels 12a–12d which are to be secured together. Preferably, the splice longeron 30 will be about equal to the overall length of the fuselage skin panels 12 such that the splice longeron 30 will overlap the longitudinal edges 26c and 26d of each of the fuselage panels 12c and 12d, respectively, for the entire length of each fuselage skin panel 12c and 12d.

Referring now to FIG. 6, the coupling of converging stiffening portions 20c and 20d of fuselage skin panels 12c and 12d, respectively, will be described. In the doubly curved portion of the fuselage 12, the stiffening portions 20c and 20d converge towards longitudinal edges 26c and 26d of each of the respective fuselage skin panels 12c and 12d. The first step in securing the fuselage skin panels 12c and 12d together, therefore, is the trimming of end portions of the converging stiffening portions 20c and 20d to allow room for the splice longeron 30 to be laid over the longitudinal edge portions 26c and 26d of adjacent skin panels 12c and 12d, respectively. This is shown in phantom by cut edge 32c of stiffening portion 20c. Cut edge 32c allows splice longeron 30 to be laid over the longitudinal edges 26c and 26d without interference from stiffening portion 20c. If not for cut edge 32c, the portion of the stiffening portion 20c which runs out to the longitudinal edge 26c would interfere with placement of the splice longeron 30 along the longitudinal edge 26c.

With further reference to FIG. 6, once each of the stiffening portions 20c and 20d have been trimmed or cut to make room for the splice longeron 30, the splice longeron is placed over the longitudinal edges 26c and 26d along preferably the entire length of each panel 12c and 12d. The splice longeron 30 includes an upright portion 30a and connecting portions 30b. The connecting portions 30b are preferably each formed with a plurality of openings 31 which allow rivets or mechanical fasteners to be used to secure the connecting portions 30b to each of the longitudinal edges 26c and 26d along the full length of each of the fuselage skin panels 12c and 12d. It will be appreciated, however, that other means of attaching the longeron 30 could also be employed, such as welding or adhesive bonding, in which case it would not be necessary to form the openings 31.

With further reference to FIG. 6, once the splice longeron 30 is secured to the fuselage skin panels 12c and 12d, independent fastening members 34 are used to secure portions of each of the stiffening portions 20c and 20d to the splice longeron 30. Each of the independent fastening members 34 is a component which may be produced through conventional casting, forging or machining techniques to provide a first portion 34a and a second portion 34b. The second portion 34b is formed at an angle relative to the first portion 34a, which is the angle at which each of the stiffening portions 20 converges toward the longitudinal edge 26 of its fuselage skin panel 12. The first portion 34a of each fastening member 34 includes an upright portion 36 and a connecting portion 38. Each of the portions 36 and 38 include openings 39 which allow the fastening member 34 to be secured such as by rivets to the splice longeron 30. The second portion 34b of each fastening member 34 is generally L-shaped and also includes a plurality of openings 40 which permit the second portion 34b to be secured to the stiffening portion 20c such as by rivets. In this regard it will be appreciated that once the fastening members 34 have been positioned in place, if rivets or mechanical fasteners are to be used for securing, then holes will need to be drilled at the appropriate places in the upright portion 30a of splice longeron 30 and in the stiffening portions 20c to allow the rivets to pass therethrough. Once the fastening members 34 are secured to the splice longeron 30, an extremely rigid and structurally strong joint is formed. It will be appreciated that while FIG. 6 illustrates only one point at which the stiffening portions 20c and 20d run out to the longitudinal edges 26c and 26d, respectively, that in fact there will almost always be multiple points at which the stiffening portions 20 of adjacently positioned fuselage skin panels 12 run out to the longitudinal edges of the panels 12a–12d and will need to be coupled together. Thus, the coupling arrangement shown in FIG. 6 will be present, in most cases, at a large plurality of points in a doubly curved fuselage 12.

The apparatus and method of the present invention allows the fuselage panels to be extruded, which is a very cost-effective method of manufacture because it involves less labor and utilizes a much greater fraction of raw material than if the fuselage panels (including the integrally formed stiffening portions) were machined directly out of plate.

Those skilled in the art can now appreciate from the foregoing description that the broad teachings of the present invention can be implemented in a variety of forms. Therefore, while this invention has been described in connection with particular examples thereof, the true scope of the invention should not be so limited since other modifications will become apparent to the skilled practitioner upon a study of the drawings, specification and following claims.

What is claimed is:

1. A method for constructing a fuselage portion of an aircraft, wherein the fuselage includes a portion having a non-constant diameter, said method comprising the steps of:

extruding a plurality of panels, each of said panels being formed with at least one integrally formed stiffening portion extending longitudinally therealong generally parallel to a longitudinal edge of said panel;

forming each of said panels into a fuselage skin panel having a portion with a non-constant radius of curvature;

trimming each of said fuselage skin panels such that when secured together said fuselage skin panels form a section of said aircraft fuselage having a non-constant diameter, and further such that said stiffening portion of each said fuselage skin panel runs out to a longitudinal edge of its associated said fuselage skin panel;

securing said longitudinal edges of adjacent pairs of said fuselage skin panels to one another by a plurality of splice longerons; and securing each said stiffening portion to a portion of said longeron by a fastening member.

2. The method of claim 1, further comprising the step of using a plurality of fastening members to secure said stiffening portions of adjacent ones of said fuselage skin panels which converge into said splice longerons to said splice longerons.

3. The method of claim 2, wherein an upright portion of each of said integrally formed stiffening portions is cut near said longitudinal edge of its associated said fuselage panel to provide clearance for said splice longeron to be secured to said longitudinal edge.

4. The method of claim 3, wherein said splice longerons are formed by extruding into inverted T-shaped members.

5. The method of claim 1, wherein each said integrally formed stiffener is formed in an inverted L-shape to project from an inner surface of its associated said fuselage panel.

6. The method of claim 1, wherein said splice longerons are secured to said fuselage skin panels via a plurality of mechanical fasteners; and wherein said fastening members are secured to each said splice longeron by a plurality of fasteners.

7. A method for constructing a fuselage portion of an aircraft, wherein the fuselage includes a doubly-curved portion, said method comprising the steps of:

extruding a plurality of panels, each of said panels being formed with at least one integrally formed stiffening portion extending longitudinally therealong generally parallel to a longitudinal edge of its associated said panel;

forming each of said panels into a fuselage skin panel having a desired contour;

trimming each of said fuselage skin panels at portions thereof which, when said fuselage skin panels are assembled, will form a fuselage section having a doubly-curved portion;

placing each of said trimmed fuselage skin panels adjacent one another such that longitudinal edges of each of said trimmed fuselage skin panels is adjacent another one of said trimmed fuselage skin panels;

trimming an endmost portion of each said stiffening portion to provide clearance for a splice longeron to be placed over and along abutting longitudinal edges of each adjacent pair of said trimmed fuselage skin panels;

forming a splice longeron;

placing said splice longeron along said longitudinal edges of one adjacent pair of said trimmed fuselage skin panels such that said splice longeron overlaps portions of said longitudinal edges;

securing said splice longeron to each of said longitudinal edges of said adjacent pair of trimmed fuselage skin panels; and using a first fastening member to secure said stiffening portion of a first one of said adjacent pair of trimmed fuselage skin panels to said splice longeron; and using a second fastening member to secure said stiffening portion of a second one of said adjacent pair of trimmed fuselage skin panels to said spice longeron.

8. The method of claim 7, further comprising the step of:

forming a plurality of holes in said splice longeron which overlap said longitudinal edges of said adjacent pair of trimmed fuselage skin panels; and using a plurality of mechanical fasteners to secure said splice longeron to said longitudinal edges.

9. The method of claim 7, further comprising the step of:

forming a plurality of holes in said splice longeron which overlap said longitudinal edges of said adjacent pair of trimmed fuselage skin panels; and using adhesives to secure said splice longeron to said longitudinal edges.

10. The method of claim 8, further comprising the steps of:

securing an independent fastening member to a portion of said integrally formed stiffening portion of one of said pair of said fuselage skin panels and to said splice longeron.

11. The method of claim 7, wherein the step of forming a splice longeron comprises the step of forming a splice longeron by extruding in an inverted T-shape.

12. The method of claim 7, further comprising the step of:

forming a plurality of openings in each of said integrally formed stiffening portions, and using independent fastening members to fasten each one of said integrally formed stiffening portions to an associated one of said splice longerons.

13. A method for constructing a fuselage portion of an aircraft, wherein the fuselage portion includes a portion having a non-constant diameter, said method comprising the steps of:

extruding a plurality of panels, each of said panels being formed with a plurality of generally parallel extending, integrally formed stiffening portions extending longitudinally therealong, each of said stiffening portions forming an inverted L-shaped portion of said panel;

forming each of said panels into a fuselage skin panel having a desired non-constant diameter contour;

trimming each of said fuselage skin panels such that when said fuselage skin panels are secured together they form a portion of said aircraft fuselage having said desired non-constant diameter contour;

placing longitudinal edges of a pair of said fuselage skin panels closely adjacent one another;

placing an independent, elongated splice longeron over each of said longitudinal edges such that portions of said splice longeron overlap said longitudinal edges of each of said fuselage skin panels; and securing said splice longeron to said longitudinal edges of said pair of fuselage skin panels to form a portion of a fuselage portion of said aircraft.

14. The method of claim 13, further comprising the step of:

securing each said integrally formed stiffening portion which runs out into said splice longeron with independent mechanical fastening members to provide added structural rigidity to said fuselage portion.

15. An aircraft fuselage having a doubly curved portion, said fuselage comprising:

a plurality of fuselage skin panels, each said fuselage skin panel being formed with a plurality of generally parallel extending, integrally formed stiffening portions running longitudinally along and generally parallel to a longitudinal edge of its associated said fuselage skin panel, each of said fuselage skin panels further being formed such that, when assembled, said fuselage skin panels form a doubly curved portion of said fuselage;

each of said stiffening portions being trimmed at an edge portion that runs out to said longitudinal edge of its associated said fuselage skin panel such that when a pair of adjacent said fuselage skin panels are formed in doubly curved shapes, an area exists along said longitudinal edges where a splice longeron may be placed without interference from said stiffening portions;

a plurality of elongated splice longerons for securing longitudinal edges of adjacent ones of said fuselage skin panels together; and a plurality of independent fastening members, each one of said fastening members operating to secure an end portion of one of said stiffening portions that runs out toward said longitudinal edge of its respective said fuselage skin panel to one of said longerons, to provide added structural rigidity to said fuselage.

16. The fuselage of claim 15, wherein said independent fastening members each include a first portion and a second portion, said first portion being securable to a portion of one of said integrally formed stiffening portions and said second portion being securable to a portion of one of said splice longerons.

17. The fuselage of claim 16, wherein said independent fastening member is secured to said one stiffening portion and said one splice longeron by rivets.

18. The fuselage of claim 16, wherein said independent fastening member is secured to said one stiffening portion and said one splice longeron by mechanical fasteners.

19. The fuselage of claim 15, wherein each said splice longeron includes an upright portion and a pair of connecting portions, said connecting portions being adapted to lay flat on portions of adjacent ones of said fuselage skin panels and to be secured thereto by external fastening elements.

20. The fuselage of claim 19, wherein said upright portion of each said splice longeron is adapted to be coupled to a pair of said fastening members.

21. The fuselage of claim 15, wherein each said fastening member includes a first portion and a second portion, with the second portion formed so as to extend at an angle relative to the first portion.

22. The fuselage of claim 21, wherein said angle is approximately that angle at which each of said stiffening portions runs out at said longitudinal edge of its associated fuselage skin panel.

\* \* \* \* \*